July 26, 1966 K. H. SCHNEIDER 3,263,170
EXPANDED SCALE VOLTMETER BRIDGE CIRCUIT HAVING EQUAL VALUE
LINEAR AND NON-LINEAR IMPEDANCE ARMS AT BALANCE
Filed Aug. 2, 1961
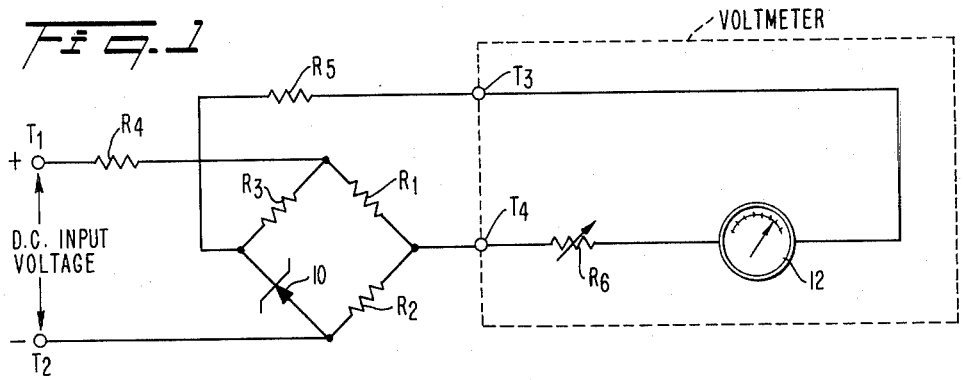
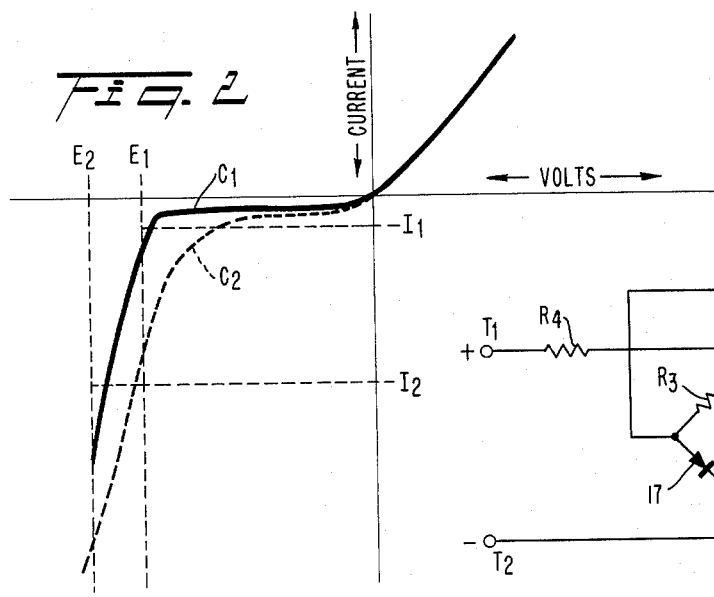
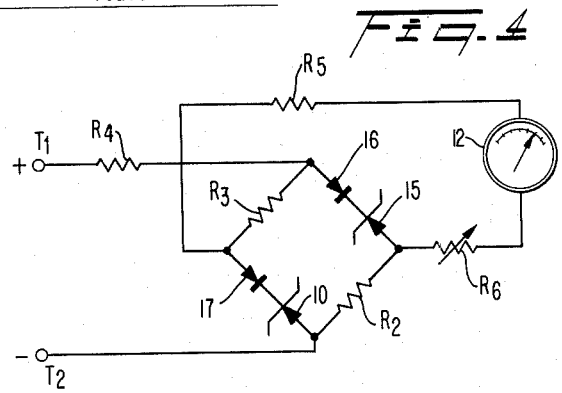
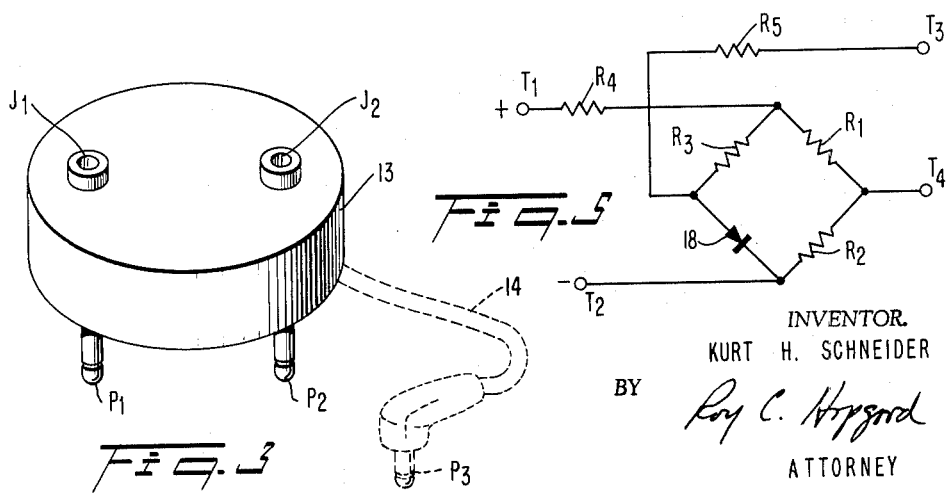
INVENTOR.
KURT H. SCHNEIDER
BY Roy C. Hopgood
ATTORNEY

United States Patent Office 3,263,170
Patented July 26, 1966

3,263,170
EXPANDED SCALE VOLTMETER BRIDGE CIRCUIT HAVING EQUAL VALUE LINEAR AND NON-LINEAR IMPEDANCE ARMS AT BALANCE
Kurt H. Schneider, Maspeth, N.Y., assignor, by mesne assignments, to A & M Instrument, Inc., Long Island City, N.Y., a corporation of Delaware
Filed Aug. 2, 1961, Ser. No. 128,736
6 Claims. (Cl. 324—131)

This invention relates in general to expanded scale voltmeters and in particular to expanded scale voltmeters which utilize bridge circuits containing non-linear elements such as diodes or the like. The invention is applicable to A.C. or D.C. voltmeters, and it can be used as a permanent part of the voltmeter or as a plug-in adapter to adapt a standard voltmeter for expanded scale operation.

Expanded scale voltmeters per se are old in the art. It is well known that expanded scale operation can be produced in a voltmeter by means of a bridge circuit which contains three resistors and a non-linear element such as a diode or the like. This bridge is adapted to balance at a predetermined starting voltage level and to become progressively more unbalanced as the voltage is increased above the starting level. This unbalance is caused by the non-linear characteristics of the fourth element in the bridge. The unbalance voltage is read by a standard voltmeter connected across the bridge.

The above described bridge circuits perform their intended function of providing expanded scale operation, but they have heretofore suffered from several serious shortcomings. For proper operation they have heretofore required auxiliary power supplies, which are costly and cumbersome and which reduce the reliability of the circuit. Without the power supplies the impedance of these bridge circuits has been too low to provide the required accuracy even in relatively coarse voltmeters. Furthermore, these circuits were inefficient in terms of power consumption, due to their low impedance, and it was necessary to design each bridge circuit for a particular application rather than having a common bridge circuit which could be used in many applications. In addition, these prior art bridge circuits used resistors of unequal size in the bridge, which reduced the sensitivity of measurement and increased errors due to variations in temperature. Moreover, these prior art circuits could not be packaged in a small, compact unit because of the heat generated in the bridge circuit components, which had to be relatively large to accommodate the $I^2R$ losses arising from the relatively low impedance of the bridge circuit.

Accordingly, one object of this invention is to provide an expanded scale voltmeter circuit which is simpler in structure, higher in impedance, and more reliable in operation than those heretofore known in the art.

Another object of this invention is to provide an expanded scale voltmeter bridge circuit which can be packaged in a small plug-in adapter unit which can be used to adapt standard voltmeters for expanded scale operation.

A further object of this invention is to provide an expanded scale voltmeter bridge circuit which can be used in many different applications.

An additional object of this invention is to provide an expanded scale voltmeter which is more efficient and longer lived than those heretofore known in the art.

Another object of this invention is to provide an expanded scale voltmeter bridge circuit which is more sensitive than those heretofore known in the art and less subject to errors due to temperature variations.

Another object of this invention is to provide an expanded scale voltmeter bridge circuit which can be packaged in a small, compact unit.

Other objects and advantages of the invention will be apparent to those skilled in the art from the following description of one specific embodiment thereof, as illustrated in the attached drawings in which:

FIG. 1 is a schematic circuit diagram of one illustrative embodiment of the invention;

FIG. 2 is a characteristic curve for the diode shown in FIG. 1 and for a diode used in prior art bridge circuits;

FIG. 3 is a perspective view of one illustrative plug-in adapter unit of this invention;

FIG. 4 is a schematic circuit diagram of a second embodiment of the invention; and FIG. 5 is a schematic circuit diagram of a third embodiment of the invention.

Referring to FIG. 1, the expanded voltmeter bridge circuit of this invention is quite similar to the prior art bridge circuits at first glance. It comprises a bridge containing three resistors R1 ... R3 and a Zener diode 10. A D.C. voltage is applied across the bridge in opposite polarity to the Zener diode through a series dropping resistor R4, whose resistance value determines the voltage level at which the bridge circuit will balance. It will be noted that R4 and the bridge circuit form a voltage divider across voltage input terminals T1 and T2. Therefore the input voltage will divide between R4 and the bridge circuit in proportion to their respective resistances. Thus a common bridge circuit can be adapted to balance at any desired starting voltage level by selecting the appropriate value for R4.

When input voltage is applied across the bridge, Zener diode 10 initially presents a very high impedance, and the bridge is therefore unbalanced in reverse polarity to the meter 12 which is coupled across the center of the bridge. This moves the needle of the voltmeter away from its zero position and presses it against the stop on the left hand side of the meter. This small reverse deflection indicates that voltage has been applied to the meter but that the input voltage is below the predetermined starting level for the particular expanded scale range of the meter. The reverse deflection does not harm the meter in any way; it rather provides a useful indication that the meter is operating properly. The applied voltage will not always be large enough to deflect the needle in the positive direction, but in those cases it will produce a small negative deflection if it is working properly.

As the voltage across the bridge is increased, the voltage across Zener diode 10 rises until the diode reaches its break down voltage level, at which time the impedance of the diode drops quite suddenly and the bridge becomes balanced, thus moving the needle of meter 12 back to its zero level. Any further increase in voltage will unbalance the bridge in the other direction and deflect the needle of meter 12 in its positive direction. The full scale voltage reading of meter 12 is determined by the resistance of a series dropping resistor R5, and an adjustable series dropping resistor R6 is usually added to the meter circuit for purposes of calibration. The scale of the meter is, of course, marked in volts from the starting voltage level determined by the resistance of R4 to the full scale deflection level determined by the resistance of R5 and R6.

The bridge circuit can be permanently coupled to the meter circuit or it can be packaged separate from the meter circuit as indiacted by the dotted lines in FIG. 1. When the bridge circuit is separate from the meter circuit it is preferably adapted to be plugged into meter input terminals T3 and T4, which are located on the front panel of most standard voltmeters. FIG. 3 shows one illustrative plug-in package unit which can be used to house the bridge circuit. This unit comprises a small cylindrical housing 13 which contains the bridge circuit and its associated resistors R4 and R5; a pair of input jacks J1 and J2 which correspond to terminals T1 and T2 in FIG. 1; and a pair of plugs P1 and P2 which are adapted to fit into the input jacks of a standard voltmeter. The latter mentioned jacks correspond to terminals T3 and T4 in FIG. 1. Since some voltmeters have three input jacks (positive, negative, and common) it might be necessary to add a third plug P3 to the package in cases where the common jack is not adjacent to the other two jacks. In this case P3 is connected to housing 13 by a conductor 14 which is long enough to reach the common jack when plugs P1 and P2 are engaged in their respective positive and negative jacks. One of the plugs would be dummies in this arrangement, since only two connections are required between the bridge circuit and the voltmeter. The particular plugs to use in any given instance will, however, be apparent to those skilled in the art. Housing 13 can be made of any suitable material, but it is preferably made as small as possible for convenience. In accordance with the novel features of this invention, the bridge components can be mounted in a compact enclosed housing such as shown in FIG. 3 without danger of overheating, and therefore this invention makes possible a small plug-in unit which can be used to adapt standard voltmeters for expanded scale operation.

Although the bridge circuit of this invention does not differ in general configuration from the prior art bridge circuits, it differs quite significantly in more particular considerations such as the type of diode employed in the circuit and the resistance values selected for the bridge. The diode 10 is an alloyed junction Zener diode which has a very sharp transition between its high impedance and its low impedance state, as illustrated by the curve C1 in FIG. 2, which also shows the characteristic curve C2 of the diffused junction diodes used in the prior art expanded scale bridge circuits. Resistors R1, R2, and R3 are all equal in resistance value, which is selected to match the low impedance value of the diode when the bridge is balanced. In the prior art circuits resistors R1, R2, and R3 were unequal in size. The significance of these changes can be more fully appreciated by considering the response of diode 10 to a voltage applied to terminals T1 and T2.

When back voltage is first applied across diode 10, the current therethrough remains approximately constant at a very low level (0.1 ma. or thereabouts) until the breakdown voltage $E_1$ is reached, at which time the impedance of the diode drops to a low level and any further increase in voltage will produce large increases in current through the diode. At this point the bridge becomes balanced and any further increase in voltage will cause a deflection of the meter needle. In the example illustrated in FIG. 2, $E_2$ represents the bridge voltage which produces full scale deflection of the meter. It will be noted that only a small current $I_1$ is required to move diode 10 from the non-deflecting portion of its curve to the deflecting portion thereof, which in this example is the voltage range $E_1$–$E_2$. In the prior art, a relatively large current $I_2$ was required to move the prior art diodes into the corresponding range of their characteristic curve, which meant that low impedance resistors had to be used in the bridge circuit and that an auxiliary power supply had to be used to provide a relatively large initial current bias for the diode. This large bias current, of course, produced large $I^2R$ losses in the bridge circuit, which meant that the components had to be relatively large in power rating and that they could not be packaged in a small enclosed housing without overheating. By contrast, the bridge circuit of this invention employs relatively high impedance resistors and requires no bias current except for the very low current produced by the input voltage. Therefore the bridge circuit of this invention can use small, low power components which can be safely packaged in a compact totally enclosed plug-in unit without any danger of overheating. This invention does not reside in the plug-in unit per se, but one very significant advantage of the invetion is that it is adapted to be packaged in a compact plug-in unit. The prior art circuits, with their auxiliary power supply and their large, high power components could not be so packaged.

The equal bridge resistors used in this invention provide further advantages. They increase the sensitivity of the meter reading and make the bridge less subject to errors due to change in temperature. They also simplify the process of manufacture by using a common resistor size. In this connection it should be noted that another important advantage of this invention is that a common bridge circuit can be used for many different applications. This invention can be adapted for any desired starting voltage and full scale deflection without any alteration of the bridge circuit components. The resistance value selected for R4 sets the starting voltage level and the resistance value selected for R5 sets the full scale deflection level.

FIG. 4 shows a second embodiment of the invention which contains two resistors and two non-linear elements arranged in a bridge circuit. In this second embodiment, resistor R1 is replaced by a second Zener diode 15 which is identical to Zener diode 10. In addition to the second Zener diode, this circuit also contains temperature compensating silicon diodes 16 and 17, which are selected to counteract temperature induced variations in their respective Zener diodes. The circuit of FIG. 4 is similar in its operation to the circuit of FIG. 1, but because of the second Zener diode it produces twice the unbalance voltage across the meter for a given input voltage. Therefore the circuit of FIG. 4 is particularly useful in applications which requires a high current consumption in the voltmeter or a high ratio of voltage suppression to full scale reading. (The voltage below the level required to deflect the meter is said to be suppressed. Thus if the starting voltage is 9 volts and the full scale deflection is 10 volts the ratio is 9/10=90%, which is relatively high.) With the circuit of FIG. 4, a voltage suppression to full scale reading ratio of 95% can be achieved while maintaining a high input impedance to the bridge circuit.

FIG. 5 shows a third embodiment of the invention which is adapted for very low suppressed voltage ranges. The circuits of FIGS. 1 and 4 are limited to a minimum suppressed voltage of approximately 3.0 volts due to the characteristics of the Zener diodes used therein. In accordance with a further aspect of this invention, it has been found that lower minimum suppressed voltages can be achieved by replacing the Zener diode 10 with a Uni-Tunnel diode 18 which is operated in its forward conduction region instead of its backward conduction region. The Uni-Tunnel diode is a highly doped semiconductor diode which has high forward conduction at low voltage levels and excellent temperature stability, which obviates the need for temperature compensating elements in most applications thereof. With the Uni-Tunnel diode, the minimum voltage suppression level of the bridge circuit can be lowered from 3.0 volts to approximately 0.5 volt, with a substantial increase in temperature stability. The full scale deflection of the Uni-Tunnel bridge circuit can, of course, be set to any desired level by appropriate selection of R5, which performs the same function in the Uni-Tunnel bridge circuit as it did in the Zener bridge circuits. The Uni-Tunnel bridge circuit can be adapted for high current meters or high voltage suppression to full scale ratios by replacing R1 with a second Uni-Tunnel diode. This will double the unbalance voltage across the bridge without lowering the bridge impedance.

It will be apparent to those skilled in the art that the above described expanded scale voltmeter circuit could be used to measure A.C. voltages by adding a rectifier in series with the input voltage, and also that the accuracy of the circuit could be further improved by using temperature compensated precision resistors.

From the foregoing description it will be apparent that this invention provides a novel expanded scale voltmeter circuit which is simpler in structure, higher in impedance, and more reliable in operation than those heretofore known in the art. It will also be apparent that this invention provides an expanded scale voltmeter bridge circuit which can be packaged in a small plug-in unit to adapt standard voltmeters for expanded scale operation. It will further be apparent that this invention provides an expanded scale voltmeter bridge circuit which can be used in many different applications and which is more efficient and less costly than those heretofore known in the art.

Although this invention has been described with reference to specific embodiments thereof, it should be understood that the invention is by no means limited to the specific structure disclosed. Many modifications can be made in the structure disclosed without departing from the spirit of this invention, which includes all modifications falling within the scope of the following claims.

I claim:

1. An expanded scale voltmeter circuit comprising three resistors and a Zener diode coupled together to form a bridge circuit having three linear branches and one non-linear branch, said bridge circuit further including a pair of input terminals for receiving a voltage from a source of voltage to be measured and also including a pair of output terminals, a meter connected between said pair of output terminals and having an indicator which is at rest position when said bridge is balanced, said Zener diode being of the alloyed junction type, said Zener diode further having a relatively low value of back current in the non-Zener region of its characteristic curve and a relatively sharp transition between the non-Zener and Zener regions of its characteristic curve, each of said resistors being approximately equal to each other in resistance value, said resistors further having a resistance value equal to the back impedance of said Zener diode when said meter indicator is in said rest position, whereby there is provided an expanded scale voltmeter having an improvement in sensitivity by a factor of approximately 10, and also having significantly reduced error due to temperature changes.

2. The combination defined in claim 1 which further includes a fourth resistor coupled in series with said meter between said meter and one of said output terminals.

3. The combination defined in claim 1 wherein said bridge circuit contains four junctions arranged in opposing pairs, said pair of junctions comprising said pairs of input and output terminals, said voltmeter circuit further including a fourth resistor coupled at one end to one junction of a first pair of junctions and a fifth resistor coupled at one end to one junction of the second pair of junctions.

4. The combination defined in claim 3 and also including a portable housing member, said bridge circuit and said fourth and fifth resistors being mounted within said housing member, a pair of input jacks mounted on one surface of said housing member, one of said input jacks being coupled to the other end of said fourth resistor and the other of said input jacks being coupled to the other of said first pair of junctions, and a pair of output plugs connected to an opposing surface of said housing member, one of said output plugs being coupled to the other end of said fifth resistor and the other of said output plugs being coupled to the other of said second pair of junctions.

5. An expanded scale voltmeter circuit in accordance with claim 1 wherein a Uni-Tunnel diode is substituted for said Zener diode.

6. An expanded scale voltmeter circuit comprising two resistors and two Zener diodes coupled together to form a bridge circuit having two linear branches and two non-linear branches, said resistors being in the bridge arms opposite one another and said Zener diodes also being in the bridge arms opposite one another, said bridge circuit further including a pair of input terminals for receiving a voltage from a source of voltage to be measured and also including a pair of output terminals, a meter connected between said pair of output terminals and having an indicator which is at rest position when said bridge is balanced, said Zener diodes being of the alloyed junction type, said Zener diodes further having a relatively low value of back current in the non-Zener region of their characteristic curves and a relatively sharp transition between the non-Zener and Zener regions of their characteristic curves, each of said resistors being approximately equal to each other in resistance value, said resistors further having a resistance value equal to the back impedance of said Zener diodes when said meter indicator is in said rest position, whereby there is provided an expanded scale voltmeter having an improvement in sensitivity by a factor of approximately 10, and also having significantly reduced error due to temperature changes.

References Cited by the Examiner

UNITED STATES PATENTS

| | | | |
|---|---|---|---|
| 1,660,285 | 2/1928 | Weston | 324—149 |
| 2,526,329 | 10/1950 | Chamberlain | 324—131 |
| 2,864,057 | 12/1958 | Connelly | 324—156 |
| 2,947,941 | 8/1960 | Corson | 324—119 |
| 3,065,636 | 11/1962 | Pfann | 307—88.5 |
| 3,068,410 | 12/1962 | Galman | 324—119 |

FOREIGN PATENTS 1,213,117   3/1960   France.

WALTER L. CARLSON, *Primary Examiner.*

BENNETT G. MILLER, *Examiner.*

R. V. ROLINEC, *Assistant Examiner.*